(12) United States Patent  
Cheng et al.

(10) Patent No.: US 8,062,601 B2
(45) Date of Patent: Nov. 22, 2011

(54) EMISSION SCR $NO_X$ AFTERTREATMENT SYSTEM HAVING REDUCED $SO_3$ GENERATION AND IMPROVED DURABILITY

(75) Inventors: Yisun Cheng, Ann Arbor, MI (US); Clifford Norman Montreuil, Livonia, MI (US); Giovanni Cavataio, Dearborn, MI (US); Douglas Allen Dobson, Ypsilanti, MI (US); Christine Kay Lambert, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/912,095

(22) Filed: Oct. 26, 2010

(65) Prior Publication Data

US 2011/0162349 A1   Jul. 7, 2011

(51) Int. Cl.
*B01D 50/00* (2006.01)
*F01N 3/10* (2006.01)

(52) U.S. Cl. ............ 422/177; 422/180; 60/295; 60/302; 423/239.2

(58) Field of Classification Search .............. 60/274, 60/295, 299, 302; 422/177, 180, 171; 423/239.1, 423/239.2
See application file for complete search history.

(56) References Cited

U.S. PATENT DOCUMENTS

| | | | |
|---|---|---|---|
| 5,501,714 A | 3/1996 | Valentine et al. | |
| 6,003,303 A | 12/1999 | Peter-Hoblyn et al. | |
| 6,758,036 B1 | 7/2004 | Molinier | |
| 6,928,806 B2 * | 8/2005 | Tennison et al. | 60/286 |
| 7,763,222 B2 * | 7/2010 | Miyairi et al. | 423/239.1 |
| 7,799,289 B2 * | 9/2010 | Robel | 422/180 |
| 2003/0039597 A1 | 2/2003 | Deeba et al. | |
| 2009/0035195 A1 * | 2/2009 | Robel | 422/177 |
| 2009/0155151 A1 * | 6/2009 | Liu et al. | 423/239.1 |
| 2009/0173063 A1 * | 7/2009 | Boorse et al. | 60/299 |
| 2009/0193796 A1 * | 8/2009 | Wei et al. | 60/297 |
| 2009/0223207 A1 | 9/2009 | Ren | |

FOREIGN PATENT DOCUMENTS

EP    2123345    *  5/2008

OTHER PUBLICATIONS

Machine Translation of EP2 123345 from http://esp@cenet, downloaded Mar. 31, 2011.*

B.H. Engler et al., Development of improved Pd-only and Pd/Rh three-way catalysts, Copyright 1995 Elsevier B. V.,ScienceDirect—Studies in Surface Science and Catalysis : Development of improved Pd- . . . http://www.sciencedirect.com/science?_ob=ArticleURL&udi=B8GYB-4NYD6X9-1C&..., 2 Pages.

(Continued)

*Primary Examiner* — Nina Bhat
(74) *Attorney, Agent, or Firm* — Damian Porcari; Brooks Kushman P.C.

(57) ABSTRACT

An exemplary emission treatment system for reducing gases from the exhaust of an engine includes an exhaust passage for transporting the exhaust from the engine. A selective catalytic reduction (SCR) catalyst is disposed within the passage, and an oxidation catalyst is disposed in the passage upstream of the SCR catalyst. The oxidation catalyst has noble metal, with at least 90 wt. % of the metal comprising palladium (Pd).

20 Claims, 2 Drawing Sheets

OTHER PUBLICATIONS

Fredrik Klingstedt et al., Palladium based catalysts for exhaust aftertreatment of natural gas powered vehciles and biofuel combustion, Copyright 2001 Elsevier Science B.V., ScienceDirect—Applied Catalysis A: General : Palladium based catalysts for exhaust after . . . http://www.sciencedirect.com/science?_ob=ArticleURL&udi=B6TF5-42DX2VK-2N&_..., 4 Pages.

B.H. Engler et al., Development of improved Pd-only and Pd/Rh three-way catalysts, Copyright 1995 Elsevier B. V.,ScienceDirect—Studies in Surface Science and Catalysis : Development of improved Pd- . . . http://www.sciencedirect.com/science?_ob=ArticleURL&udi=B8GYB-4NYD6X9-1C&..., 2 Pages, Available Online Jun. 12, 2007.

Fredrik Klingstedt et al., Palladium based catalysts for exhaust aftertreatment of natural gas powered vehciles and biofuel combustion, Copyright 2001 Elsevier Science B.V., ScienceDirect—Applied Catalysis A: General : Palladium based catalysts for exhaust after . . . http://www.sciencedirect.com/science?_ob=ArticleURL&udi=B6TF5-42DX2VK-2N&_..., 4 Pages, Published Feb. 28, 2001.

* cited by examiner

EMISSION SCR NO$_x$ AFTERTREATMENT SYSTEM HAVING REDUCED SO$_3$ GENERATION AND IMPROVED DURABILITY

BACKGROUND

1. Technical Field

One or more of the embodiments of the present invention relate to an emission treatment system for removal of regulated combustion components from the exhaust of a combustion process, such as an internal combustion engine.

2. Background Art

Exhaust from a combustion engine typically contains a variety of combustion components or gases such as unburned hydrocarbon (HC), carbon monoxide (CO), particulate matter (PM), nitric oxide (NO), and nitrogen dioxide (NO$_2$), with NO and NO$_2$, collectively referred to as nitrogen oxide or NO$_x$.

Exhaust emission control or treatment systems have used Selective Catalytic Reduction (SCR) catalysts with NH$_3$ for NO$_x$ control on engines, such as lean-burn gasoline engines and diesel engines. SCR catalysts use base metals to promote the reaction between NO$_x$ and NH$_3$ to produce N$_2$ under lean conditions. Moreover, exhaust emission control systems have employed oxidation catalysts, such as a diesel oxidation catalyst (DOC), to reduce the amount of HC and CO in the exhaust gas.

Base metal/zeolite SCR catalysts are among the leading candidates for treatment of NO$_x$ emissions for North American diesel applications using urea as a reducing agent. It is known that these SCR catalysts are sensitive to sulfur poisoning, especially the copper-zeolite formulations. Even with the use of ultra low sulfur fuel, sulfur poisoning is still a durability issue that impacts on SCR catalyst activity.

Sulfur is usually present as SO$_2$ in the feed gas. Insofar as diesel oxidation catalysts (DOCs) will be employed upstream of the SCR catalysts for most applications, it is likely that a portion of the SO$_2$ will be oxidized into SO$_3$. Recently, it was observed that SCR activity was significantly reduced for Cu/zeolite SCR catalysts poisoned by SO$_3$ vs. those poisoned by SO$_2$ as shown in FIG. 1.

There is thus a continuing need to provide an emission treatment system that provides a relatively high NO$_x$ reduction efficiency while minimizing system complexity and substantially avoiding the effects of SO$_3$ aging. Such a system can reduce SO$_3$ generation and thus minimize catalyst deactivation by SO$_3$ aging.

SUMMARY

According to at least one aspect of the invention, an emission treatment system for reducing gases from the exhaust of a combustion engine is provided. In at least one embodiment, the emission treatment system includes an exhaust passage for transporting the exhaust from the engine, a particulate filter disposed within the passage, a selective catalytic reduction (SCR) catalyst disposed within the passage, and an oxidation catalyst disposed in the passage upstream of the SCR catalyst, wherein the oxidation catalyst has platinum group metal (PGM), and at least 90 wt. % of the platinum group metal comprising palladium (Pd).

In at least one embodiment, at least 95 wt. % of the platinum group metal comprises palladium (Pd). In at least another embodiment, at least 98 wt. % of the platinum group metal comprises palladium (Pd). In at least one variation of this embodiment, at least 99.99 wt. % of the platinum group metal comprises palladium (Pd).

In at least another embodiment, the platinum group metal further comprises rhodium (Rh). In at least one variation of this embodiment, the rhodium (Rh) comprises 0.1 to 10.0 wt. % of the platinum group metal of the oxidation catalyst.

In at least still yet another embodiment, the oxidation catalyst is essentially free of platinum.

According to at least another embodiment of the present invention, an emission treatment system for reducing gases from the exhaust of an engine is provided. In at least this embodiment, the emission treatment system includes an exhaust passage for transporting the exhaust from the engine, a selective catalytic reduction (SCR) catalyst disposed within the passage, and an oxidation catalyst disposed in the passage upstream of the SCR catalyst, with the oxidation catalyst having platinum group metal comprising rhodium (Rh) and palladium (Pd), with at least 90 wt. % of the platinum group metal comprising the palladium (Pd).

According to at least another aspect of the present invention, a method is provided for reducing gases from the exhaust of an internal combustion engine. In at least one embodiment, the method includes providing an emission treatment system comprising an exhaust passage for transporting the exhaust from the engine, a selective catalytic reduction (SCR) catalyst disposed within the passage, and an oxidation catalyst disposed in the passage upstream of the SCR catalyst, with the oxidation catalyst having platinum group metal, with at least 90 wt. % of the platinum group metal comprising palladium (Pd), directing exhaust from the engine into the exhaust passage, exposing the exhaust to the oxidation catalyst to form a treated exhaust, and exposing the treated exhaust to the SCR.

DETAILED DESCRIPTION OF EMBODIMENT(S)

Figure 1:
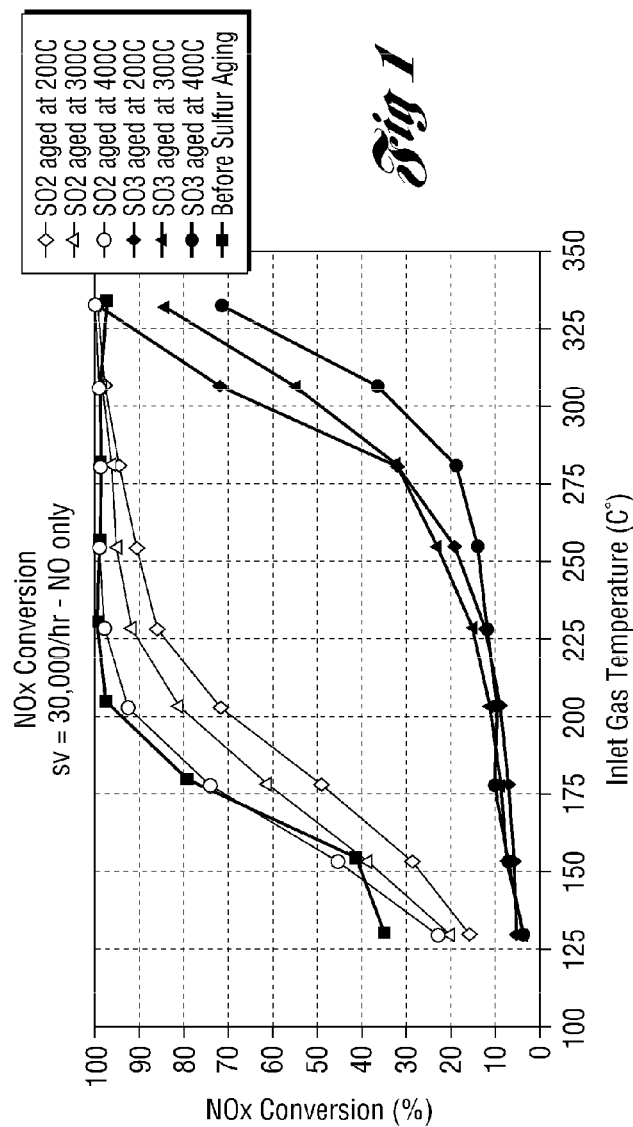
FIG. 1 illustrates NO$_x$ conversion % for SCR catalysts under various conditions of SO$_2$ and SO$_3$ exposure.

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

As used herein and unless otherwise noted, the term "PM filter" or "PF" is interchangeably used to refer to the particulate filter employed to remove particulate matter or the like.

The present invention is capable of reducing gases from the exhaust of a combustion process, such as for instance an internal combustion engine such as a diesel engine or a gasoline engine.

With respect to the Figures that will be described in detail below, like numerals are used to designate like structures throughout the Figures. An emission control or treatment system in accordance with at least one embodiment of the present invention is generally shown at 10 in FIG. 2. In at least one embodiment, the emission control system 10 includes an exhaust passage 20, an oxidation catalyst 24, an SCR catalyst 30, and a particulate filter 32.

The oxidation catalyst 24 is located in the exhaust passage 20 downstream of an engine 36 and upstream of the SCR catalyst 30. The SCR catalyst 30 is upstream of the filter 32 in the illustrated embodiment, however it should be understood that other arrangements are possible, such as an integrated SCR and filter or a filter upstream of the SCR.

An exhaust 42 containing unburned hydrocarbons (HC), carbon monoxide (CO), nitrogen oxide ($NO_x$), and particulate matter (PM) is emitted from the engine 36 through exhaust passage 20 towards the oxidation catalyst 24. The oxidation catalyst 24 helps combust unburned hydrocarbon (HC) and carbon monoxide (CO) to form carbon dioxide ($CO_2$) and water ($H_2O$). Removal of the HC and CO using the oxidation catalyst 24 helps to relieve some burden on the downstream SCR catalyst 30 in remediating the exhaust.

In addition, the oxidation catalyst 24 also converts nitric oxide (NO) to nitrogen dioxide ($NO_2$) to provide a $NO/NO_2$ ratio that is more suitable for downstream SCR catalytic reactions. An increased proportion of $NO_2$ in the $NO_x$, due to the catalytic action of the upstream oxidation catalyst 24, facilitates the reduction of $NO_x$ as compared to exhaust streams containing smaller proportions of $NO_2$ in the $NO_x$ component. Furthermore, the oxidation catalyst 24 helps to regenerate particulate filter 32 for continuous engine operation. During diesel engine operation, soot typically will accumulate on the particulate filter over time and can cause back pressure elevation which can diminish the full operating efficiency of the engine. One solution is to generate a sufficiently high temperature in the range of about 600 to 700 degrees Celsius to induce the combustion of the soot by injecting fuel onto the oxidation catalyst.

Figure 2:
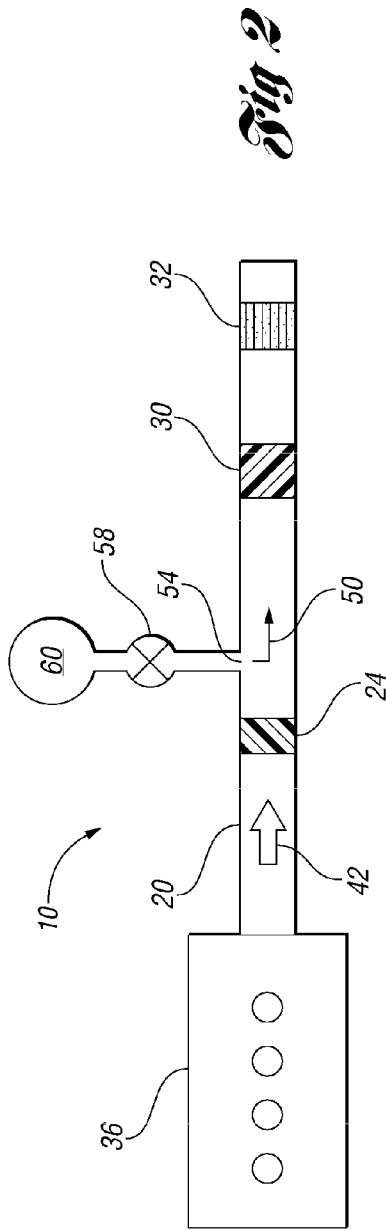
FIG. 2 schematically depicts an exemplary configuration of an emission control system according to an embodiment of the present invention.

In the embodiment illustrated in FIG. 2, a reductant 50 is selectively releasable within the exhaust passage 20 downstream of the engine 36. An opening 54 is optionally located on the exhaust passage 20 between the engine 36 and the particulate filter 32 to facilitate the introduction of the reductant 50 into the exhaust passage 20. The reductant 50, capable of reducing $NO_x$ to nitrogen $N_2$, is injected into the exhaust passage 20 optionally through a nozzle (not shown). The injection of the reductant 50 is optionally achieved through the use of a valve 58 which can be employed to meter needed amounts of the reductant 50 from reductant source 60 into the exhaust. The exhaust 42 with the reductant 50 is then conveyed further downstream to the SCR catalyst 30 for the reduction of $NO_x$. The exhaust 42 is then further conveyed downstream to the particulate filter 32 for reduction of particulate matter. In an alternative embodiment, instead of having a separate SCR catalyst 30 and a particulate filter 32, an integrated SCR catalyst disposed on a particulate (SCR/PF) could be employed downstream of the oxidation catalyst 24.

The reductant 50 may be any material suitable for reducing $NO_x$ to a harmless, releasable substance such as nitrogen $N_2$. Exemplary reducing agents are hydrocarbon (HC), ammonia ($NH_3$), an ammonia precursor such as liquid urea, or any combination thereof. As is known, when exposed to a warm or hot exhaust, urea readily decomposes to ammonia. In certain embodiments, a molar ratio of $NH_3/NO_x$ is typically kept at a value predesignated so as to inhibit excess $NH_3$ from slipping past the catalysts and out into the air. An exemplary molar ratio of $NH_3/NO_x$ is at or near one (1).

Suitable SCR catalyst compositions for the SCR catalyst 30 are able to effectively catalyze the reduction of $NO_x$. In at least one embodiment, the SCR catalyst 30 is capable of converting at least 50% of $NO_x$ to nitrogen ($N_2$), depending on the amount of the reductant 30 supplied. Useful SCR catalysts should also have thermal resistance to temperatures greater than 800 degree Celsius so that the SCR catalysts remain structurally integral throughout an exhaust treatment process.

As used herein and unless otherwise identified, a SCR catalyst is "catalytically functional" in a given temperature when at that temperature, the SCR catalyst is able to convert 50 percent or more by volume of $NO_x$ to nitrogen.

Any suitable particulate filter 32 can be used. In one embodiment, a suitable particulate filter 32 contains up to about 700 or more parallel flow tubes per square inch of cross section, although 700 or less may also be used. An exemplary wall-flow particulate filter 32 is composed of ceramic-like materials such as cordierite, α-alumina, silicon carbide, silicon nitride, zirconia, mullite, spodumene, alumina-silica-magnesia, or zirconium silicate. The pore sizes and level of porosity can be selected to allow flow exchange through the pores while ensuring that all back pressure on the particulate filter to be at a minimum. When made of ceramic material, the particulate filter 32, in at least certain embodiments, is constructed to have a porosity of from 35 to 85 percent by volume and to have a mean pore size from 5 to 30 microns.

Any suitable SCR catalyst can be employed. Exemplary suitable SCR catalysts are described in U.S. Pat. No. 4,961, 917 to Byrne, the entire content of which is incorporated by reference herein. Some suitable compositions include one or both of an iron and a copper metal atom present in a zeolite in an amount of from about 0.1 to 30 percent by weight of the total weight of the metal atoms plus zeolite. Zeolites typically have pore sizes large enough to permit adequate movement of $NO_x$, ammonia, and product molecules $N_2$ and $H_2O$. The crystalline structure of zeolites exhibits a complex pore structure having more or less regularly recurring connections, intersections, and the like. By way of example, suitable zeolites are made of crystalline aluminum silicate, with a silica to alumina ratio in the range of 5 to 400 and a mean pore size from 3 to 20 Angstroms.

Suitable SCR catalyst to be used may be a physical mixture of two or more catalysts in any suitable ratio. By way of example, the SCR catalyst 30 could be an iron-containing zeolite combined with one or more other metals selected from the group consisting of vanadium, chromium, molybdenum, tungsten, or any combinations thereof. Similarly, the SCR catalyst 30 can be a copper-containing zeolite combined with one or more other metals selected from the group consisting of vanadium, chromium, molybdenum, tungsten, or any combinations thereof.

The SCR catalyst 30 has a washcoat loading concentration defined as an amount in grams of the SCR catalyst per support. In at least one embodiment, the SCR catalyst 30 has a loading concentration in a range independently selected from no less than 0.5 g/in$^3$, 1.0 g/in$^3$, 2.0 g/in$^3$, or 3.0 g/in$^3$, to no greater than 7.0 g/in$^3$, 6.0 g/in$^3$, 5.0 g/in$^3$, or 4.0 g/in$^3$.

In at least one embodiment, the particulate filter 32 with the above-mentioned porosity is further processed to have the SCR catalyst coated thereon. In this embodiment, the SCR catalyst 30 would be combined with the filter 32 to form a SCR/PF. One exemplary method of coating a particulate filter with a SCR catalyst is illustrated in U.S. Pat. No. 7,229,597 to Patchett et al., the entire contents of which are incorporated herein by reference. In essence, the particulate filter with a desired porosity is immersed in a catalyst slurry which is then allowed to dry under compressed air. This dipping-drying process may be repeated till the desired level of coating is achieved. After coating, the particulate filter may be dried at a temperature of 100 degrees Celsius and subsequently calcined at a temperature in the range of 300 to 500 degrees Celsius.

The oxidation catalyst 24 facilitates the treatment of the engine exhaust 42 by promoting the conversion of both HC and CO gaseous pollutants and at least some portion of the particulate matter through oxidation of these pollutants to carbon dioxide and water. The oxidation catalyst 24 generally helps to break down pollutants in the exhaust to less harmful components. In particular, the oxidation catalyst utilizes palladium catalysts to mainly help reduce the unburned hydrocarbon and carbon monoxide according to the following reaction formula: $CO+O_2 \rightarrow CO_2$.

Figure 3:
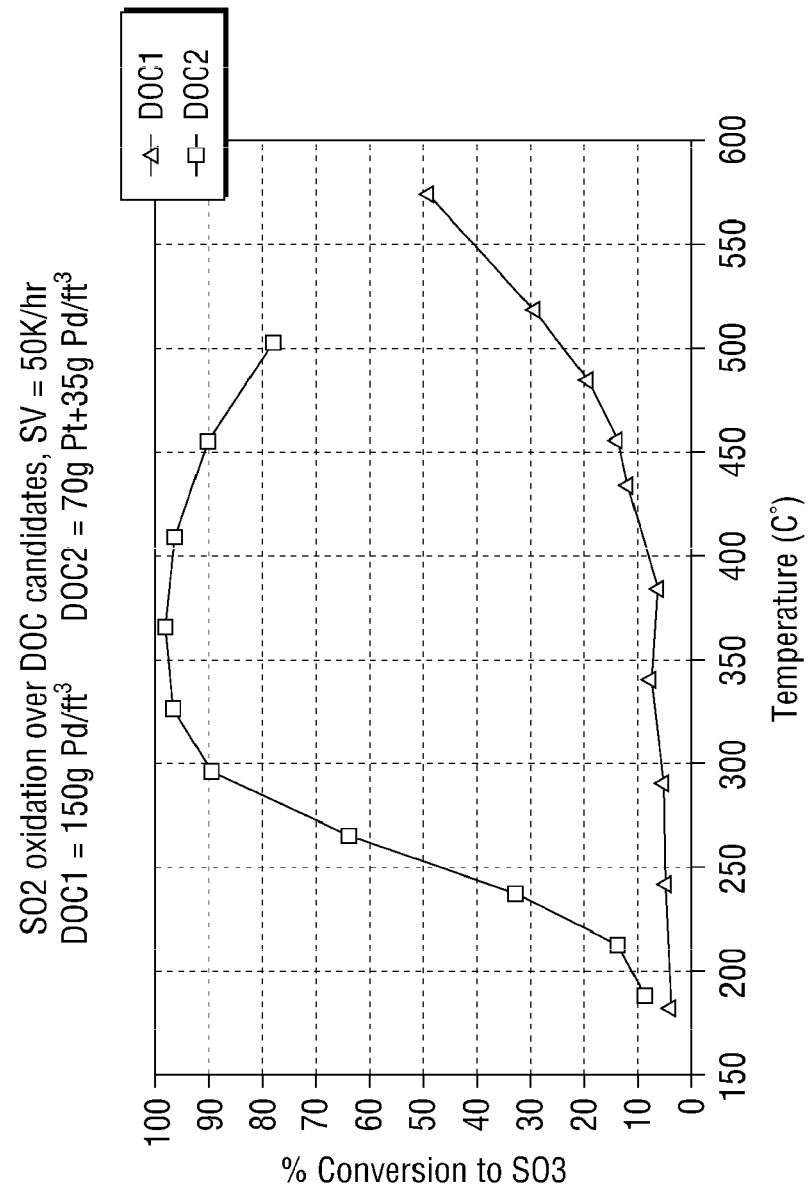
FIG. 3 illustrates SO$_2$ oxidation % over various DOCs.

Referring to FIG. 3, $SO_2$ oxidation, expressed as % conversion to $SO_3$, is illustrated for various oxidation catalysts. As can be seen in FIG. 3, a 100% Pd catalyst (DOC1) has a considerably lower % $SO_2$ conversion to $SO_3$ than an oxidation catalyst containing 67% Pt and 33% Pd (DOC2). This is particularly evident in the lower temperature ranges (150-500° C.), such as the typical engine exhaust temperature range. The discovery of the surprising difference in % $SO_3$ conversion between oxidation catalysts with a significant amount of Pt relative to oxidation catalysts having mainly Pd means that the common problem of SCR catalyst deactivation due to $SO_3$ exposure can be controlled to a significant degree by using an oxidation catalyst having no, or little, Pt.

As such, in accordance with various aspects of the disclosure, the oxidation catalyst 24 comprises platinum group metal (PGM) also called noble metal which is found in groups 8-11 in rows 5 and 6 of a periodic table of elements, with the platinum group metal comprising at least 90 weight % of palladium. In certain embodiments, the oxidation catalyst 24 can also contain base metals, transition metals (non-PGM), and combinations thereof. In one embodiment, the oxidation catalyst 24 is essentially devoid of platinum (Pt). In this context, being essentially devoid of platinum means that no more than 5 wt. % platinum has been added to the oxidation catalyst 24 in one embodiment, less than 0.01 wt. % platinum has been added in other embodiments, and no platinum has been added in yet other embodiments.

In certain embodiments, at least 95 wt. % of the platinum group metal comprises palladium, in other embodiments at least 98 wt. % of the platinum group metal comprises palladium, in yet other embodiments at least 99.99 wt. % of the platinum group metal comprises palladium, and in still yet other embodiments 100% of the platinum metal group comprises palladium. In embodiments where less than 100% of the platinum metal group comprises palladium, the platinum group metal may comprise other platinum group metals than palladium, such as rhodium and platinum. In other embodiments, the oxidation catalyst may comprise a small amount of non-platinum group base metal. In these embodiments, less than about 10 wt. % of the oxidation catalysts may comprise the non-platinum group metals.

The oxidation catalyst 24 has a washcoat loading concentration defined as an amount in grams of the oxidation catalyst per support. In at least one embodiment, the oxidation catalyst 24 has a loading concentration in a range independently selected from no less than 0.1 $g/in^3$, 0.5 $g/in^3$, 1.0 $g/in^3$, 2.0 $g/in^3$, or 3.0 $g/in^3$, to no greater than 7.0 $g/in^3$, 6.0 $g/in^3$, 5.0 $g/in^3$, or 4.0 $g/in^3$. In one embodiment, the oxidation catalyst 24 is supported on a brick upstream of the SCR catalyst 30. In other embodiments, the oxidation catalyst 24 is supported on the particle filter 32 upstream of the SCR catalyst 30.

In one embodiment, the platinum group metal of the oxidation catalyst 24 comprises rhodium and palladium. In this embodiment, the rhodium comprises 0.1 to 2.0 wt. % of the platinum group metal of the oxidation catalyst. In other embodiments, the palladium comprises 0.1 to 5.0 wt. % of the platinum group metal of the oxidation catalyst 24. In certain embodiments, the palladium and rhodium are provided in a wt. ratio of 1:0 to 10:1. In yet other embodiments, other transition metals, such as gold and/or silver, may also be present in an amount of 0.1 to 5.0 wt. % of the platinum group metal of the oxidation catalyst. In still yet other embodiment, the oxidation catalyst may also have sulfur trapping material, such as cesium, barium, strontium, magnesium, sodium, potassium, lithium, calcium and combinations thereof, present in an amount of 0.1 to 2.0 wt. % of the platinum group metal. While the sulfur trapping material may be present in the oxidation catalyst 24, in other embodiments it may be provided separate from the oxidation catalyst 24, such as on a brick upstream of the SCR catalyst. In certain embodiments, oxidation catalyst 24 has a loading of no less than 25 $g/ft^3$, 50 $g/ft^3$, 75 $g/ft^3$, 100 $g/ft^3$, or 120 $g/ft^3$, and no greater than 240 $g/ft^3$, 210 $g/ft^3$, 180 $g/ft^3$, 160 $g/ft^3$, 140 $g/ft^3$. It has been observed that using oxidation catalysts of the present invention has reduced $SO_3$, generated, particularly in the operating temperatures of automotive engines, and thus decreased SCR catalyst deactivation, resulting in an increase in catalytic activity and efficiency.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An emission treatment system for reducing gases from the exhaust of an engine, the system comprising:
    an exhaust passage for transporting the exhaust from the engine;
    a particulate filter within the passage;
    a selective catalytic reduction (SCR) catalyst within the passage; and
    an oxidation catalyst in the passage upstream of the SCR catalyst, the oxidation catalyst having noble metal, at least 90 wt. % of the noble metal comprising palladium (Pd).

2. The emission treatment system of claim 1, wherein at least 98 wt. % of noble metal comprises palladium (Pd).

3. The emission treatment system of claim 1, wherein at least 99.99 wt. % of the noble metal comprises palladium (Pd).

4. The emission treatment system of claim 1, wherein the noble metal further comprises rhodium (Rh).

5. The emission treatment system of claim 4, wherein the rhodium (Rh) comprises 0.1 to 2.0 wt. % of the noble metal of the oxidation catalyst.

6. The emission treatment system of claim 1, wherein the oxidation catalyst has a metal loading concentration of 25 to 240 $g/ft^3$.

7. The emission treatment system of claim 1, wherein the oxidation catalyst has a metal loading concentration of 75 to 210 g/ft$^3$.

8. The emission treatment system of claim 1, wherein the oxidation catalyst has sulfur trapping material in an amount of 0.1 to 2.0 wt. % of the noble metal of the oxidation catalyst.

9. The emission treatment system of claim 1, wherein the SCR catalyst comprises a base metal zeolite.

10. The emission treatment system of claim 9, wherein the base metal comprises copper (Cu).

11. The emission treatment system of claim 1, wherein the oxidation catalysts is essentially devoid of platinum (Pt).

12. The emission treatment system of claim 11, wherein the oxidation catalyst has less than 0.01 wt. % platinum (Pt).

13. The emission treatment system of claim 12, wherein the oxidation catalyst is free of platinum (Pt).

14. The emission treatment system of claim 4, wherein the palladium (Pd) and rhodium (Rh) are provided in a wt. ratio of 10:1 to 1:0.

15. The emission treatment system of claim 1, wherein the oxidation catalyst is disposed on the particulate filter and is upstream of the SCR catalyst.

16. An emission treatment system comprising:
an exhaust passage for transporting exhaust from an engine;
a selective catalytic reduction catalyst disposed within the passage; and
an oxidation catalyst disposed in the passage upstream of the SCR catalyst, the oxidation catalyst having noble metal, the noble metal comprising palladium and rhodium, with at least 90 wt. % of the noble metal comprising the palladium.

17. The emission treatment system of claim 16, wherein the oxidation catalysts is essentially free of platinum (Pt).

18. A method for reducing gases from the exhaust of an engine, the method comprising:
providing an emission treatment system comprising
an exhaust passage for transporting the exhaust from the engine;
a particulate filter disposed within the passage;
a selective catalytic reduction (SCR) catalyst disposed within the passage; and
an oxidation catalyst disposed in the passage upstream of the SCR catalyst, the oxidation catalyst having noble metal, at least 90 wt. % of the noble metal comprising palladium (Pd);
directing exhaust from the engine into the exhaust passage;
exposing the exhaust to the oxidation catalyst to form a treated exhaust; and
exposing the treated exhaust to the SCR.

19. The method of claim 18, wherein at least 98 wt. % of the noble metal comprises palladium (Pd).

20. The method of claim 18, wherein at least 99.99 wt. % of the noble metal comprises palladium (Pd).

* * * * *